United States Patent
Philipp et al.

(10) Patent No.: US 9,041,682 B2
(45) Date of Patent: May 26, 2015

(54) DRIVING ELECTRODES WITH DIFFERENT PHASE SIGNALS

(75) Inventors: Harald Philipp, Hamble (GB); Brent Guard, Southampton (GB)

(73) Assignee: Atmel Corporation, San Jose, CA (US)

( * ) Notice: Subject to any disclaimer, the term of this patent is extended or adjusted under 35 U.S.C. 154(b) by 371 days.

(21) Appl. No.: 12/605,068

(22) Filed: Oct. 23, 2009

(65) Prior Publication Data

US 2011/0095991 A1 Apr. 28, 2011

(51) Int. Cl.
*G06F 3/045* (2006.01)
*G06F 3/044* (2006.01)
*G06F 3/041* (2006.01)

(52) U.S. Cl.
CPC .... *G06F 3/0416* (2013.01); *G06F 2203/04104* (2013.01); *G06F 3/044* (2013.01)

(58) Field of Classification Search
CPC ....................................................... G06F 3/044
USPC ........................................ 345/174; 178/20.04
See application file for complete search history.

(56) References Cited

U.S. PATENT DOCUMENTS

| | | | | |
|---|---|---|---|---|
| 5,374,787 | A * | 12/1994 | Miller et al. ................ | 178/18.06 |
| 6,825,833 | B2 * | 11/2004 | Mulligan et al. ............... | 345/174 |
| 7,663,607 | B2 | 2/2010 | Hotelling | |
| 7,864,503 | B2 | 1/2011 | Chang | |
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 8,217,902 | B2 | 7/2012 | Chang | |
| 8,237,667 | B2 * | 8/2012 | Krah .............................. | 345/173 |
| 8,723,824 | B2 | 5/2014 | Myers | |
| 8,847,898 | B2 | 9/2014 | Brunet et al. | |
| 2006/0097991 | A1 | 5/2006 | Hotelling et al. | |
| 2007/0236466 | A1 * | 10/2007 | Hotelling ...................... | 345/173 |
| 2008/0158167 | A1 * | 7/2008 | Hotelling et al. ............. | 345/173 |
| 2008/0158173 | A1 | 7/2008 | Hamblin et al. | |
| 2008/0158183 | A1 | 7/2008 | Hotelling et al. | |
| 2008/0204422 | A1 * | 8/2008 | Moon et al. ................... | 345/173 |
| 2008/0309627 | A1 | 12/2008 | Hotelling et al. | |
| 2008/0309635 | A1 | 12/2008 | Matsuo | |
| 2009/0189867 | A1 * | 7/2009 | Krah et al. .................... | 345/173 |

(Continued)

FOREIGN PATENT DOCUMENTS

| | | | | |
|---|---|---|---|---|
| WO | WO 2009/107415 | * | 9/2009 | ................ G06F 3/02 |
| WO | WO 2012/129247 | | 9/2012 | |

OTHER PUBLICATIONS

U.S. Appl. No. 61/454,936, filed Mar. 21, 2011, Myers.

(Continued)

*Primary Examiner* — Adam J Snyder
(74) *Attorney, Agent, or Firm* — Baker Botts LLP (57) ABSTRACT

A controller includes drive circuitry to drive one target drive electrode of a touch sensitive device with a series of predetermined phase pulses and to drive at least one other drive electrode of the touch sensitive device with a corresponding series of out-of-phase pulses. Sense circuitry receives signal transferred to sense electrodes from the drive electrodes of the touch sensitive device. The received signal is responsive to one or more touches on the touch sensitive device.

19 Claims, 9 Drawing Sheets

(56) References Cited

U.S. PATENT DOCUMENTS

| | | |
|---|---|---|
| 2009/0219257 A1 | 9/2009 | Frey et al. |
| 2009/0229893 A1* | 9/2009 | Muranaka ................ 178/20.01 |
| 2009/0315854 A1 | 12/2009 | Matsuo |
| 2010/0059295 A1* | 3/2010 | Hotelling et al. .......... 178/18.06 |
| 2010/0060591 A1* | 3/2010 | Yousefpor et al. ............ 345/173 |
| 2011/0043478 A1* | 2/2011 | Matsushima ................ 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0057480 A1 | 3/2013 | Brunet et al. |
| 2013/0076612 A1 | 3/2013 | Myers |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
S. Brunet et al., U.S. Appl. No. 13/226,848, Non-final Office Action, Jun. 20, 2013.
S. Brunet et al., U.S. Appl. No. 13/226,848, Response to Non-final Office Action, Sep. 20, 2013.
S. Brunet et al., U.S. Appl. No. 13/226,848, Final Office Action, Dec. 6, 2013.
S. Brunet et al., U.S. Appl. No. 13/226,848, Request for Continued Examination and Amendment, May 6, 2014.
Brunet et al., U.S. Appl. No. 13/226,848, Notice of Allowance Jun. 6, 2014.

* cited by examiner

DRIVING ELECTRODES WITH DIFFERENT PHASE SIGNALS

BACKGROUND

Touchscreens are able to detect a touch such as by a finger or stylus within an active area. Use of a touchscreen enables a user to interact with an electronic application by touching the touchscreen. A touchscreen may include user interface constructs such as different buttons, images, or other regions that can be selected, manipulated, or actuated by touch. Such constructs may be provided by an underlying display device or may be otherwise fixed on the touchscreen. Touchscreens can therefore provide an effective user interface for cell phones, GPS devices, personal digital assistants (PDAs), computers, ATM machines, appliances and other devices.

Touchscreens use various technologies to sense touch from a finger or stylus, such as resistive, capacitive, infrared, and acoustic sensors. In one type of capacitive sensor based touchscreen, a touch changes a capacitance at a node in an array of electrodes. Capacitive touchscreens may use two separate layers of transverse electrodes, drive electrodes and sense electrodes, separated by a dielectric layer. The intersections of the transverse electrodes form the nodes. Further touchscreens may use a single layer of drive and sense electrodes. Electronics may be used to drive a series of current pulses on the drive electrodes. Charge at the nodes accumulating during each pulse is then acquired, and used to determine the location of a touch or touches.

Figure 1:
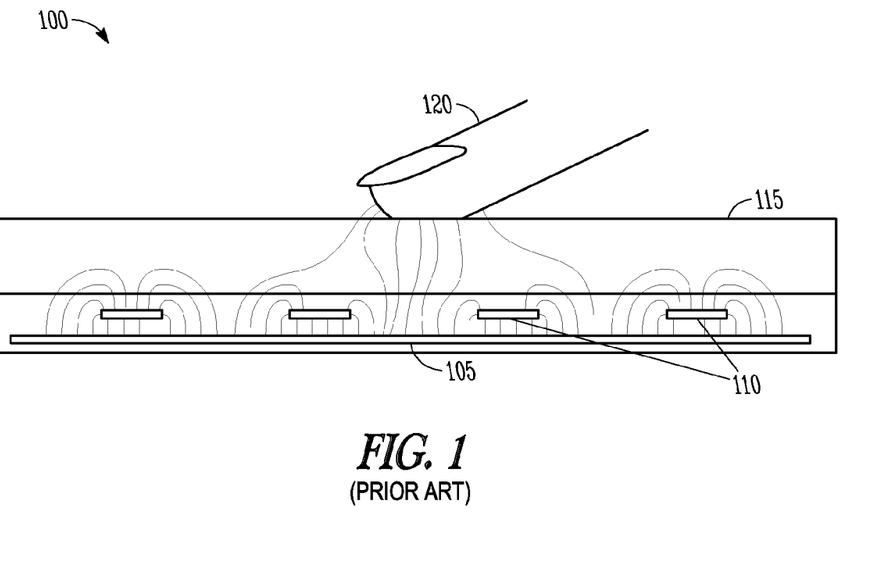
FIG. 1 is a prior art cross section representation of a touchscreen illustrating field lines in response to a touch.

An example two layer electrode structure for a touchscreen is illustrated in prior art FIG. 1 at 100. The structure includes drive or field emitting electrodes at 105 and receive electrodes 110. Field lines are illustrated as lines, and generally extend between the emitting electrodes 105 and receive electrodes 110. A front panel 115 may be positioned over the emitting and receive electrodes, and may be touched, such as by a finger or stylus represented at 120. Field lines proximate the touch are distorted by the touch, reducing an amount of charge that may be transferred between the transmit and receive electrodes proximate the touch.

Figure 2:
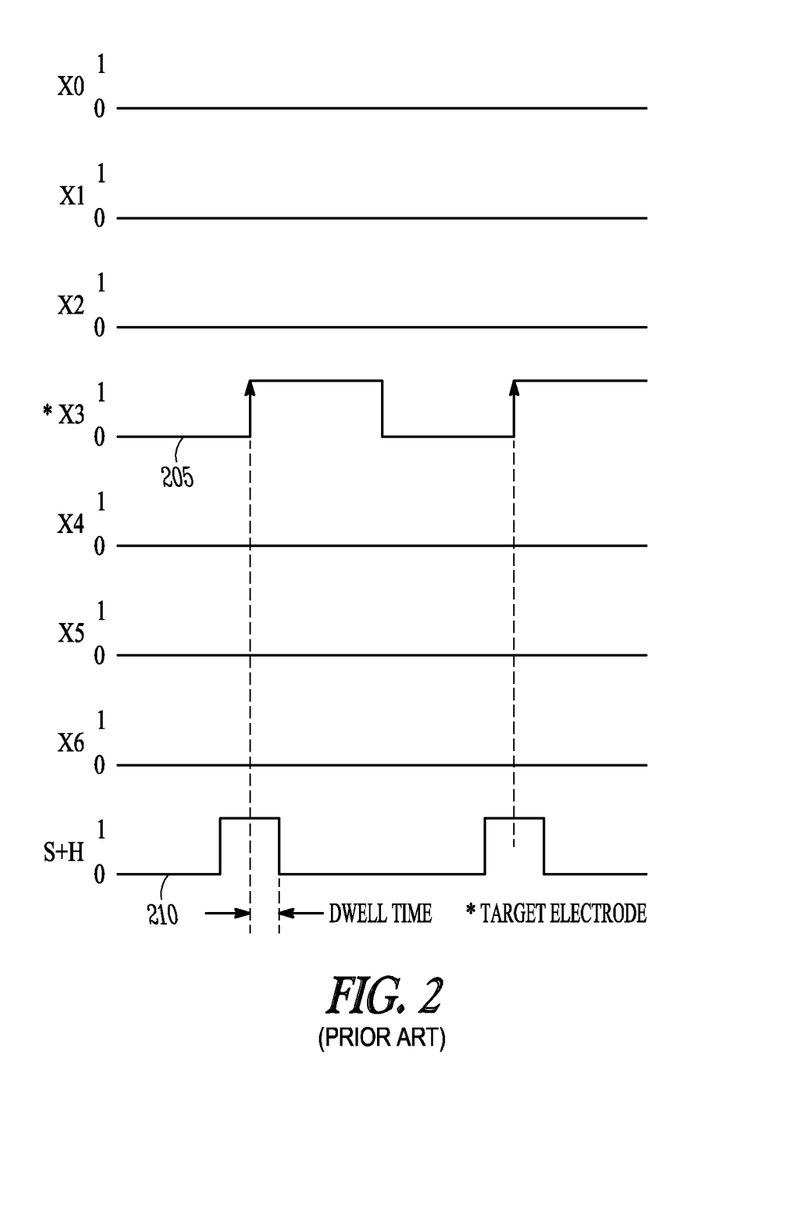
FIG. 2 is a prior art timing diagram illustrating signals on a drive electrode and charge acquisition signals.

In touchscreens with multiple drive electrodes, one drive electrode at a time is driven with pulses as indicated at signal line 205, while other drive electrodes are held at ground as indicated in a prior art timing diagram in FIG. 2. Charge on one or more receive electrodes is acquired for each sequence of pulses as indicated at charge transfer signal line 210, which is a gating signal for a charge sampler. Charge is acquired during a time that pulses in line 210 overlap pulses in line 205, referred to as a dwell time. Each drive electrode indicated at X0, X1, X2, X3, X4, X5 and X6 is driven in sequence, with acquired charge measured at the receive electrodes. The acquired charges are processed to determine a touch location on the touchscreen.

SUMMARY

Selected drive electrodes in a touch sensitive device are driven with a signal having different phase than a target drive line being driven with a predetermined phase signal. One or more drive electrodes adjacent to the target electrode may be driven out-of-phase with respect to the predetermined phase signal applied to the target drive electrode. In some embodiments, all drive electrodes other than the target drive electrode are driven out of phase. The out-of-phase signal may have a phase opposite the predetermined phase signal. In some embodiments, the signals are a series of pulses selectively applied to the drive electrodes.

DETAILED DESCRIPTION

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 3:
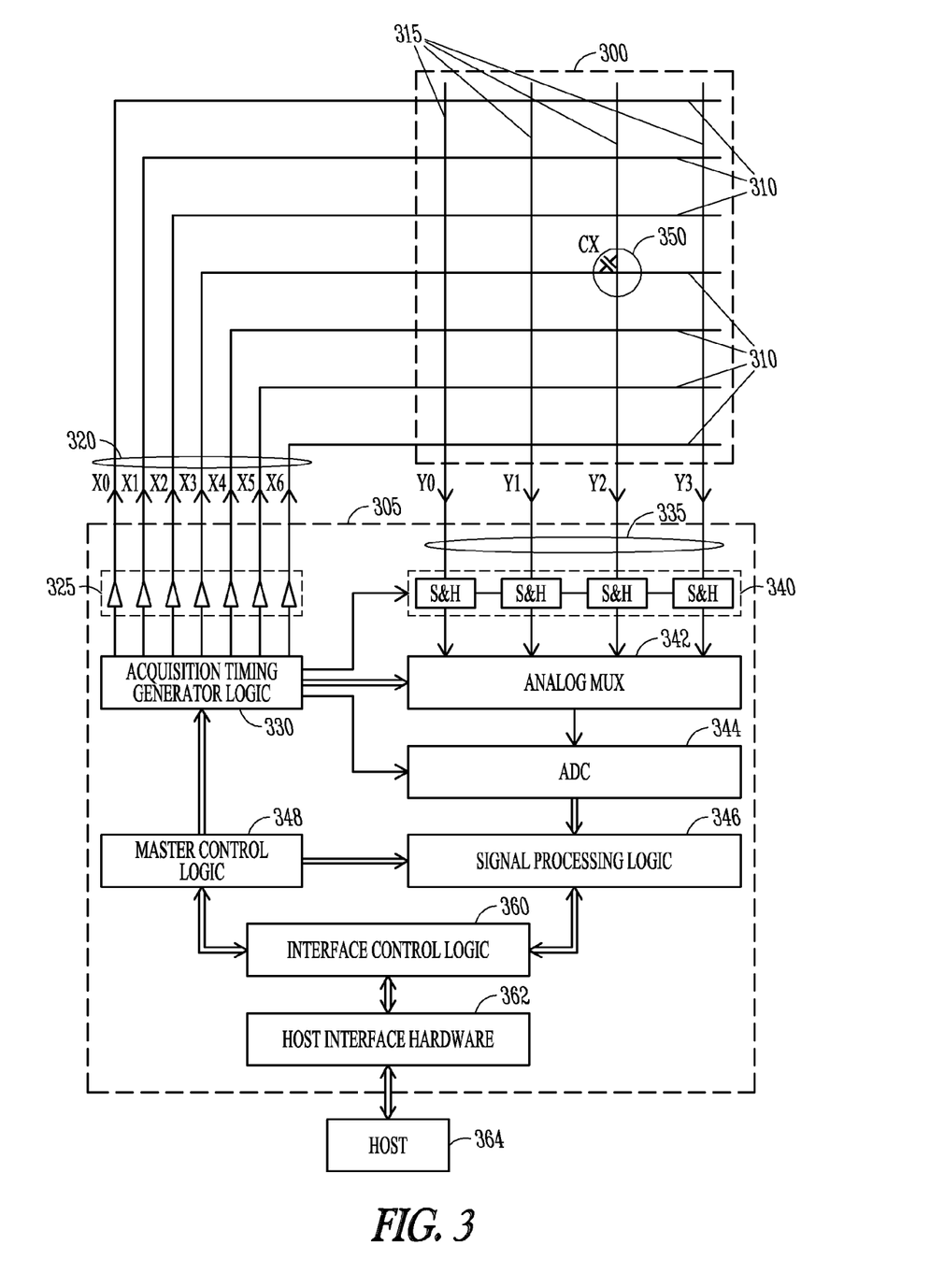
FIG. 3 is a block schematic diagram of a touchscreen and associated signal processing according to an example embodiment.

FIG. 3 is a block schematic diagram of a touchscreen 300 and associated signal processing elements 305 according to an example embodiment. Touchscreen 300 is representative of a touch sensitive device, such as a touchscreen, slider, a group of discrete buttons, or other touch sensitive device that may be used to provide an interface to different devices. Touchscreen 300 includes a plurality of field emitting electrodes 310 that transfer charge to a plurality of receive electrodes 315. The field emitting electrodes 310 may be referred to as drive electrodes or "X" electrodes, and the receive electrodes 315 may be referred to as "Y" electrodes. Touchscreen 300 shows the X and Y electrodes being formed in two different layers, and being transverse to each other. In further embodiments, the electrodes may be formed in a single layer.

In one embodiment, the field emitting electrodes 310 are coupled to respective drive lines 320, labeled X0, X1, X2, X3, X4, X5, and X6. The drive lines 320 are coupled to low impedance drivers 325, which provide electrical pulses to the field emitting electrodes under control of acquisition timing generator logic 330. In some embodiments, drive electrodes may include one or more different forms of interpolated drive electrodes, such as resistively interpolated electrodes.

The receive electrodes 315 are coupled via receive lines 335 to sample and hold circuits 340. The sample and hold circuits 340 may be coupled to the acquisition timing and generator logic 330 for control of the timing of their operation in concert with the timing of the pulses provided to the field emitting electrodes. In one embodiment, an analog multiplexor 342 and analog to digital converter (ADC) 344 are coupled to the acquisition timing and generator logic. The analog multiplexor 342 may be used to select signals from the sample and hold circuits 340 in one embodiment, and selectively provide them to ADC 344, which in one embodiment may include one or more sense capacitors that may be used to integrate charge transferred to the receive electrodes from the field emitting electrodes. Signal processing logic 346 may be used to process the information from the ADC 344 to determine the location of one or more touches on touchscreen 300. The acquisition timing generator logic 330 and signal processing logic 346 may operate under control of master control logic 348. A controller, such as master control logic 348 provides control for the acquisition timing and generator logic 330 to control the provision of pulses and charge acquisition timing, and also provides information to signal processing logic 346 regarding which lines are being driven and sensed, to facilitate the determination of touch location.

It should be noted that this circuitry is just one potential implementation for determining touch location, and that further embodiments may be used that may not include one or more of the elements, such as the sample and hold circuits or analog multiplexor. Further ways of measuring signals from the receive electrodes may also be utilized in further embodiments. Amplitude may be measured in one embodiment.

In one example of operation regarding a single drive line and receive line, drive line X3 may be driven with pulses, and a transferred charge to receive line Y2 may be measured. The amount of charge transferred is a function of an unknown capacitance, represented as Cx at 350, where the corresponding field emitting electrode and receive electrode form a node such that they exchange charge. Cx 350 is not a discrete component, and is only illustrated for purposes of explanation. Each node has a similar unknown capacitance.

The unknown capacitance Cx, may vary with a touch of the screen proximate the node. In some embodiments, the field emitting electrodes may be driven with predetermined phase pulses in sequence, with charge collected from each receive electrode while each field emitting electrode is driven. One or more other field emitting electrodes may be driven with a phase different from the predetermined phase pulses, such as an opposite phase in various embodiments described in further detail below.

In one embodiment, master control logic 348 and signal processing logic 346 may be coupled to interface control logic 360, which is in turn coupled to host interface hardware 362 to couple to a host 364. Interface control logic 360 acts as an interface between the host interface hardware 362 to process signals to and from a communication protocol for communicating with host 364. In some embodiments, a serial protocol such as serial peripheral interface (SPI) or inter-integrated circuit (I2C) may be used. Various other protocols may be used in further embodiments.

Figure 4:
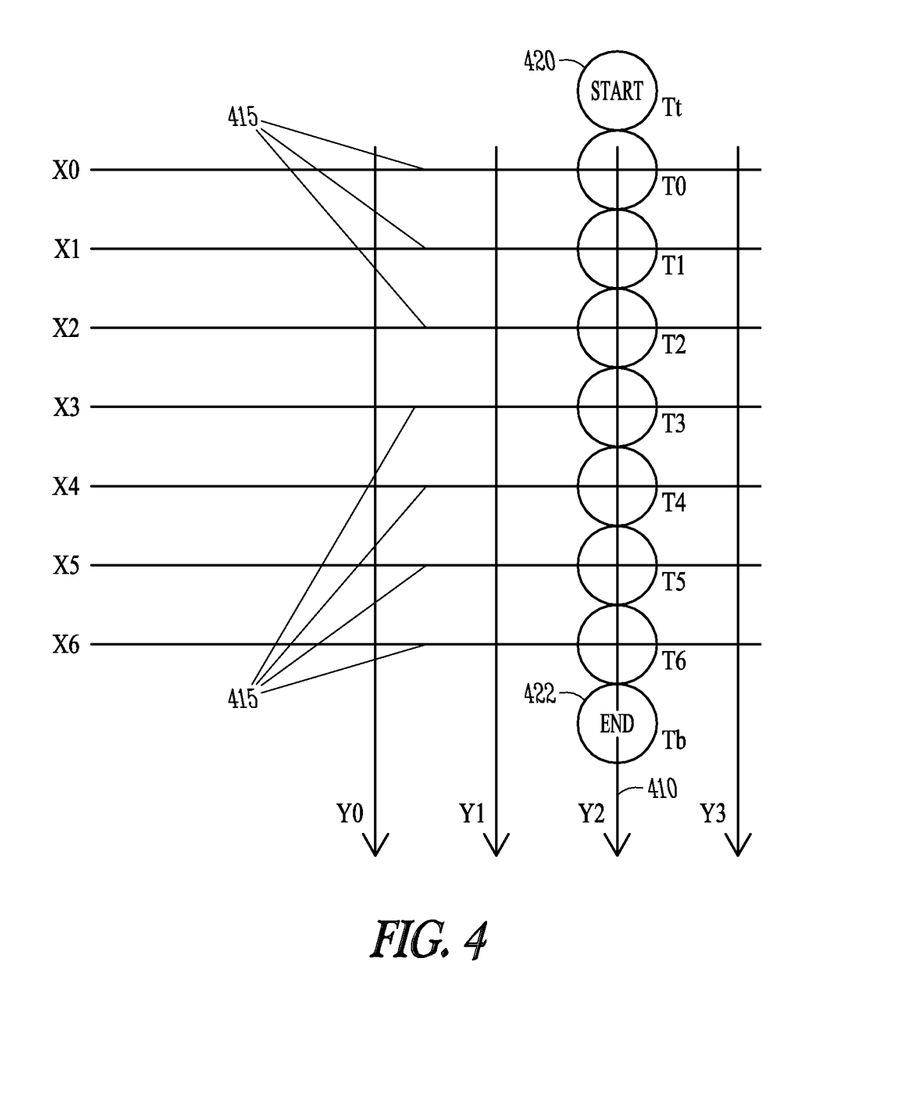
FIG. 4 is a representation of a touch progressing along a sense electrode across multiple drive electrodes according to an example embodiment.

FIG. 4 is a representation of a touch progressing along a sense electrode 410 across multiple drive electrodes 415 according to an example embodiment. Sense electrode 410 is coupled to a sense line indicated at Y2. Other sense lines are also shown and labeled Y0, Y1 and Y3. The drive electrodes 415 progress from the top of the figure to the bottom and are coupled to drive lines X0, X1, X2, X3, X4, X5 and X6. X0 to X6 may also used to refer to the corresponding drive electrodes for convenience. The touches are illustrated by circles starting at 420 and ending at 422. The starting touch 420 and ending touch 422 are both outside the array of drive electrode. Starting touch 420 is labeled as Tt, with the touch progressing through T0, T1, T2, T3, T4, T5, T6 and Tb in a sliding motion. Tb corresponds to the ending touch 422. Note also that touch T0 corresponds to a touch proximate electrode X0 and receive electrode Y2. Similarly, touch T1 corresponds to field emitting electrode X1 and receive electrode Y2. Further touches follow a similar pattern as indicated by the suffixes of T and X. The direction of motion progresses from Tt to Tb.

Figure 5:
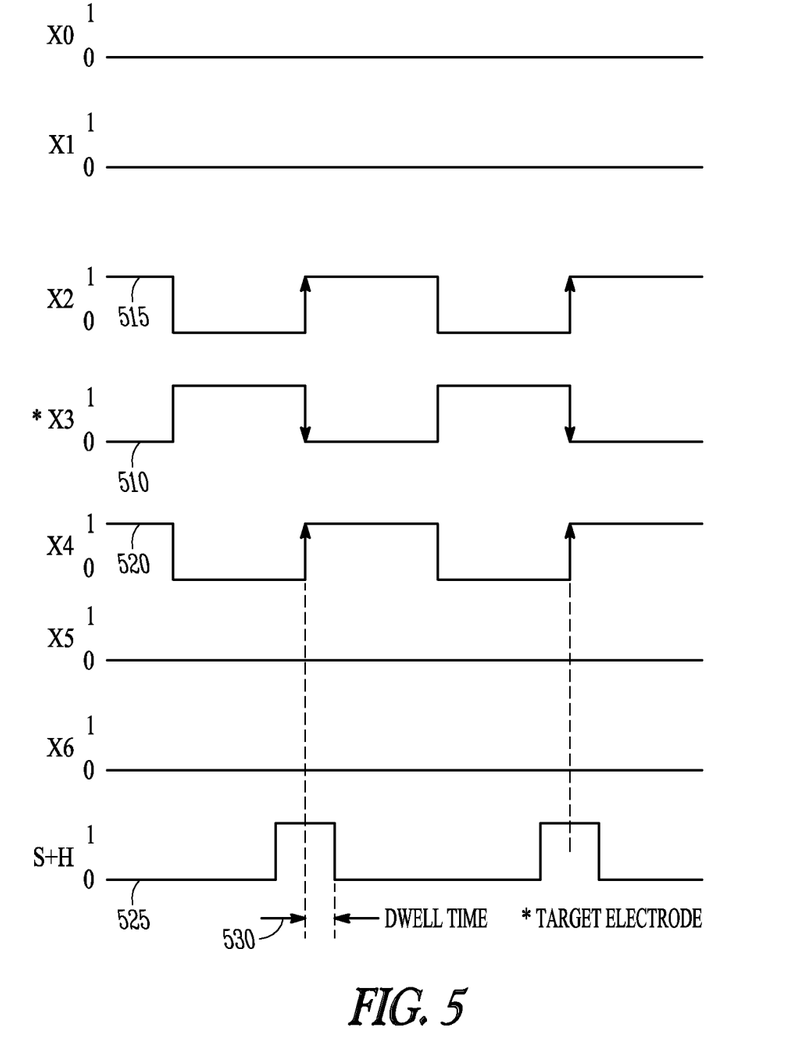
FIG. 5 is a timing diagram illustrating signals on multiple drive electrodes and charge acquisition signals according to an example embodiment.

FIG. 5 is a timing diagram illustrating signals on multiple drive electrodes and charge acquisition signals according to an example embodiment. In FIG. 5, drive line X3 and the corresponding field emitting electrode are driven with a series of pulses as indicated at 510. The series of pulses may be referred to as predetermined phase pulses. The phrase "predetermined phase" pulses will be used to refer to the pulses applied to a drive line being driven in sequence as part of a location determining cycle. The phase may correspond to rising or falling edges of pulses at the time of sampling signal on a receiving electrode. The drive electrode receiving the predetermined phase pulses may be referred to as the target electrode. In one embodiment, one or more other drive lines may be driven with out-of-phase pulses as indicated at 515 and 520 corresponding to drive lines X2 and X4, which are directly adjacent predetermined phase driven drive line X3 corresponding to the target electrode. In one embodiment, a number of out-of-phase pulses in a series of pulses may be different than a number of predetermined phase pulses.

Driving one or more other electrodes with out-of-phase pulses may be referred to as anti-phase pulsing. The anti-phase pulses may be of opposite polarity of the predetermined phase pulses applied to the target electrode. Pulses may be applied in a continuous stream, or in a bounded number in various embodiments. The following discussion refers to a bounded number of pulses that repeat as bursts, but it should be understood that the term bursts may be used interchangeably with a continuous stream of pulses.

In one embodiment where multiple field emitting electrodes are being driven with anti-phase pulses, there may be more anti-phase signal present than predetermined phase signal. This excess of anti-phase may be reduced to provide balance by using fractional bursts of anti-phase pulses. Anti-phase pulsing may be reduced by 50% in one embodiment such as by skipping every other pulse within a burst of pulses.

Charge is acquired from the receive electrode Y2 in according with charge acquisition pulses in a timing signal 525 for the sample and hold circuit. As illustrated the sample and hold pulse begins just prior to the negative transition of a predetermined phase pulses at 510. A dwell time is indicated as starting at the negative transition and ending at the end of a dwell time 530. Charge is acquired when the voltage changes after the negative transition of the predetermined phase pulses. In further embodiments, the charge acquisition pulses may be varied to begin at the same time as the negative transition or even after the negative transition such that charge may be acquired for the duration of the charge acquisition pulse or until fully transitioned, whichever occurs first. In further embodiments, the polarity of the predetermined phase and anti-phase pulses may be reversed.

Figure 6:
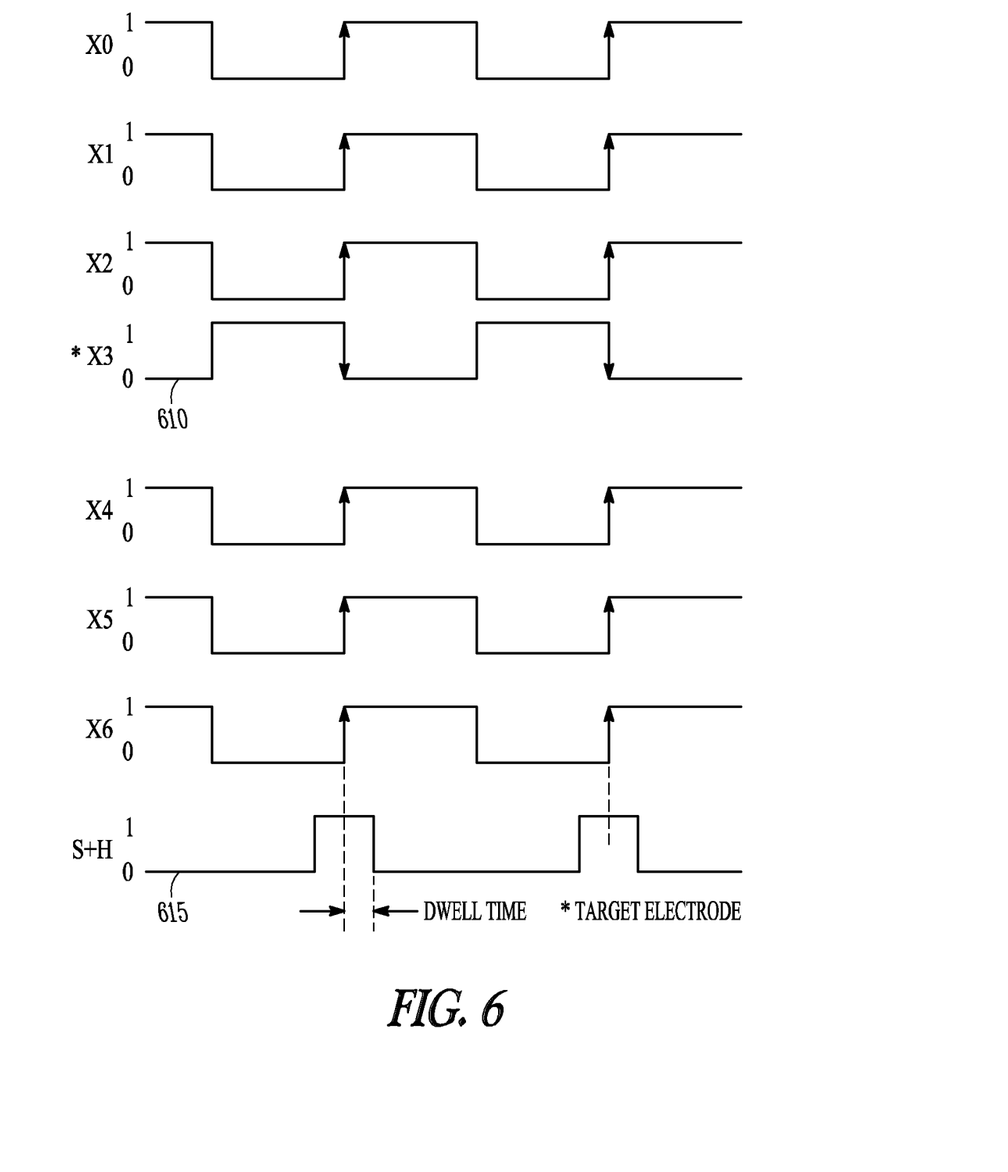
FIG. 6 is a timing diagram illustrating signals on all drive electrodes and charge acquisition signals according to an example embodiment.

FIG. 6 is a timing diagram illustrating signals on all drive electrodes and charge acquisition signals according to an example embodiment. A target electrode X3 is driven with an predetermined phase signal 610, and all other electrodes are driven out-of-phase in this embodiment. This embodiment may be referred to as anti-phase all, in which all electrodes other than the target electrode are driven out of phase with the signal applied to the target electrode. Charge is accumulated in accordance with sample and hold charge acquisition pulses 615 in the same manner as in FIG. 5.

Figure 7:
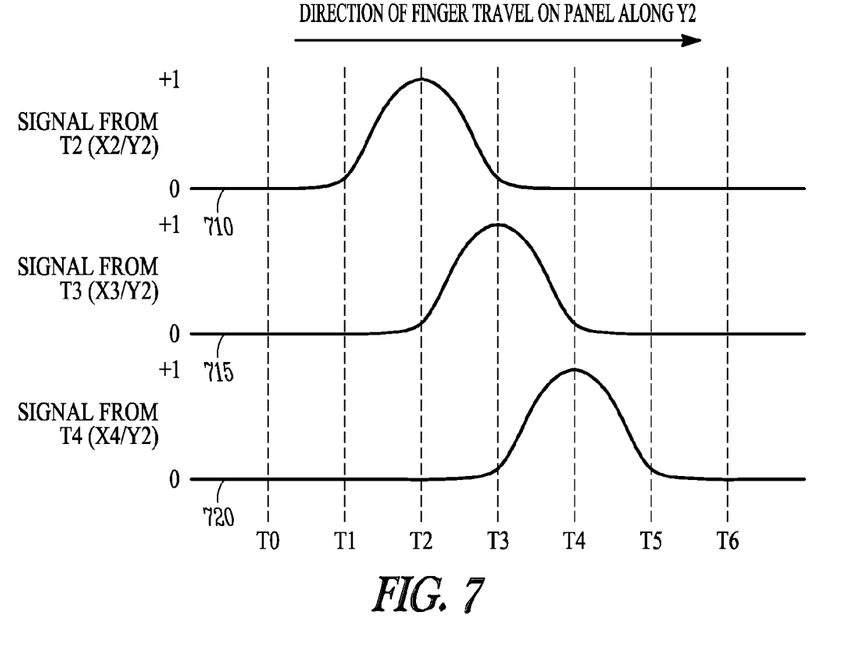
FIG. 7 is a prior art graph illustrating acquired signals as a touch progresses in accordance with the touch illustrated in FIG. 4 with single drive electrodes being driven.

FIG. 7 is a graph illustrating acquired prior art signals as a touch progresses in accordance with the touch illustrated in FIG. 4 with single drive electrodes being driven. The touch location is indicated on the x-axis. As drive line X2 is driven with predetermined phase pulses, line 710 represents the charge collected at touch T2 from receive line Y2. In this example, no other electrodes are being driven with out-of-phase pulses. Similarly, line 715 represents charge acquired from Y2 based on touch T3 while X3 is being driven with pulses, and line 720 represents charge acquired from Y2 based on touch T4 while X4 is being driven with pulses.

Figure 8:
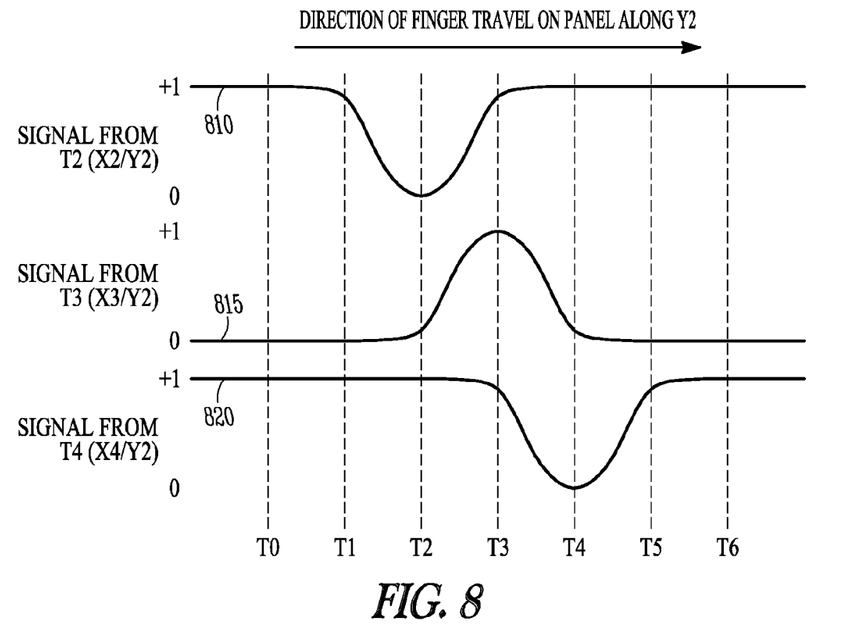
FIG. 8 is a graph illustrating acquired signals from local electrodes about a touch of an electrode being driven in phase with adjacent drive electrodes being driven out of phase according to an example embodiment.

FIG. 8 is a graph illustrating responses from three nodes while driving a target electrode X3 while the touch progresses in accordance with FIG. 4. X3 is driven in phase with adjacent drive electrodes being driven out of phase according to an example embodiment. The signals reflect theoretically isolated contributions of the nodes. In this example, electrode X3 is the target electrode being driven with predetermined phase pulses, with at least adjacent electrodes X2 and X4 being driven out of phase. The touch location for each signal is shown on the x-axis.

A first signal 810 represents a signal on Y2 corresponding to node T2. As shown signal 810 transitions from high to low at T2, and then back to high. A second signal 815 represents a signal on Y2 corresponding to node T3. The signal transitions to high about T3. A third signal 820 corresponds to node T4, and again transitions from high to low about T4. The target electrode X3 is being driven predetermined phase, with the other electrodes being driven out-of-phase in this example.

Figure 9:
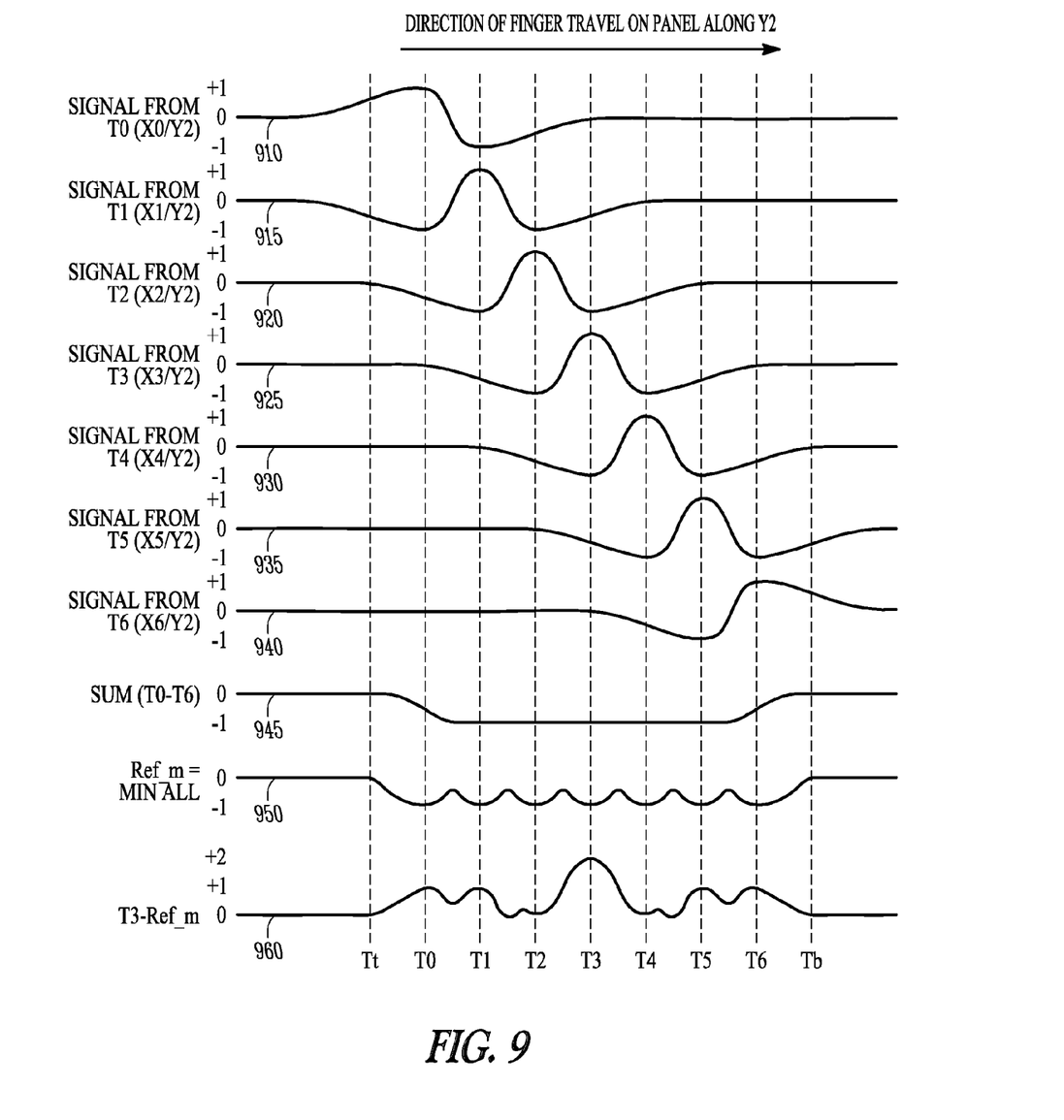
FIG. 9 is a graph illustrating acquired signals as a touch progresses in accordance with the touch illustrated in FIG. 4 with adjacent drive electrodes being driven out of phase according to an example embodiment.

FIG. 9 is a graph illustrating acquired signals as a touch progresses in accordance with the touch illustrated in FIG. 4 with adjacent drive electrodes being driven out of phase according to an example embodiment. Note that the polarities of the signals may be inverted in further embodiments. In this graph, the signals reflect the responses from seven nodes as a touch is wiped from Tt to Tb. As the touch progresses, each X electrode proximate the touch is driven predetermined phase as the target electrode, while one or more local electrodes are driven out-of-phase.

A signal 910 corresponds to the signal from node X0/Y2. Since X1 is an edge electrode, X1 is driven out-of-phase. The signal collected shows an increase to T0, and a negative rebound approaching T1. Signal 915 corresponds to the signal from node X1/Y2. Signal 915 illustrates a positive signal acquisition about T1, with negative signal response on both sides of T1. Similar results are seen in further signals indicated at 920, 925, 930, and 935, corresponding to nodes X2/Y2, X3/Y2, X4/Y2, and X5/Y2. Signal 940 has a response similar to that shown in signal 910, as X6 is also an edge electrode.

Signal 945 represents a sum of the all the previous signals on Y2. It may be used as an artificial reference signal in some embodiments. Signal 945 starts at 0, decreases at the touch corresponding to edge electrode X0, levels off, and then increases back toward zero about the touch corresponding to edge electrode X6. It illustrates a reduced sensitivity about the edges of the touchscreen. Signal 950 is an alternative artificial reference signal that is determined as a minimum of the signals collected on Y2. It looks like a ripple type of signal that appears to extend to the edge of the touchscreen. It may provide a good artificial reference signal to the edge of the touchscreen. Line 960 represents the signal received on Y2 while driving target electrode X3, subtracting out the reference signal 950. As can be seen, the differential return at T3 is almost twice the return without using the out-of-phase signals on electrodes adjacent the target electrode.

One advantage of driving electrodes local or adjacent to the target electrode with out-of-phase pulses is that the entire touchscreen need not be driven out-of-phase with the target electrode. This means that saturation of the analog to digital converter is less likely to occur. If the ADC saturates, the signals become non-linear, and may make it difficult to determine touch location.

Figure 10:
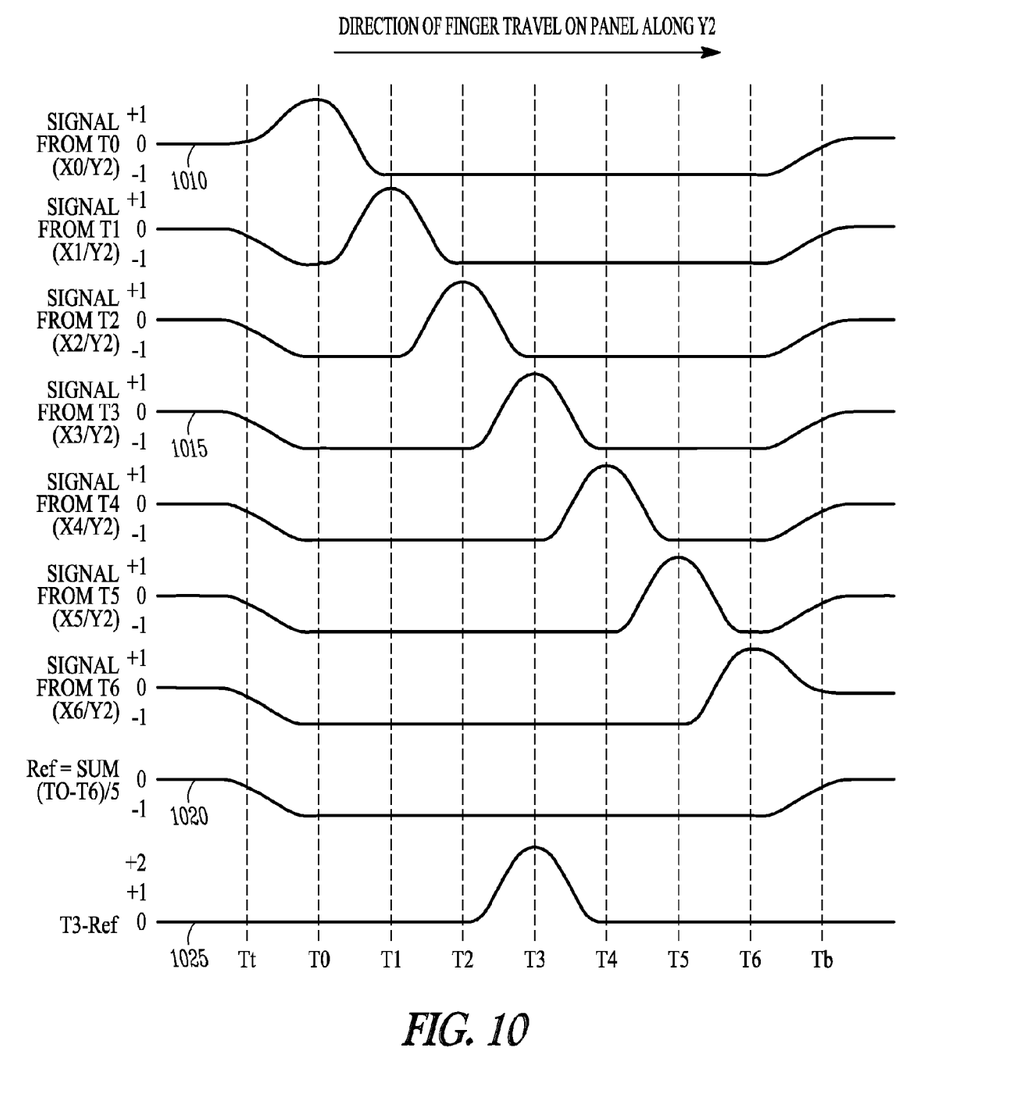
FIG. 10 is a graph illustrating acquired signals as a touch progresses in accordance with the touch illustrated in FIG. 4 with all other drive electrodes other than the electrode proximate the touch being driven out of phase according to an example embodiment.

FIG. 10 is a graph illustrating acquired signals as a touch progresses in accordance with the touch illustrated in FIG. 4 with all other drive electrodes other than the target electrode being driven out-of-phase according to an example embodiment. As in FIG. 9, the signals represent each of the target X electrodes being sequentially driven predetermined phase. However, all electrodes other than the target electrode are driven out-of-phase. Signal 1010 corresponds to a signal received from node T0 as the touch progresses. After transitioning high, it moves to −1, and returns toward zero at the other edge of the touchscreen after T6. The signals from other nodes inside the touchscreen are similar to each other. A signal 1015 corresponds to X3 being the target electrode during the finger travelling from Tt to Tb. The signal transitions from low to high at T3 and back to low. A reference signal is indicated at 1020, and may be calculated as a normalized signal (Sum(T0+T1+T2+T3+T4+T5+T6)/5) from the above signals. The normalization is done with two less than the number of locations, since the signals at the edges cancel each other out. This provides a normalization that scales appropriately with the other signals. In further embodiments, many different normalizations may be used. Finally, a position signal from node T3 with the reference subtracted from it by signal processing logic 146 is shown at 1025. It shows a clean signal clearly indicating the location of a touch along the Y2 electrode at field emitting electrode X3, referred to as node X3/Y2. The signal level represents a difference between the acquired signal and the reference signal and such difference is nearly twice that of the prior devices where only one electrode is driven.

The increase in signal level enhances the signal to noise ratio of the recovered field and allows a corresponding reduction in signal acquisition time. The pulsing of neighboring drive electrodes out-of-phase also means that the gradient of signal change with regard to touch between adjacent drive lines is steepened as illustrated in FIG. 10, resulting in a sharper, more defined response in a same confined zone. In various embodiments, about twice the signal change may be obtained at a given touch position. This may provide a sharper resolution of touch, allowing multiple touches to be closer together while remaining detectable as separate touches.

Since the signal change may be obtained by differential measurements at different points across a sensing surface, drift compensation may not be needed, as channels corresponding to receive electrodes may drift at substantially the same rate. The artificial reference may not be subject to drift, and a calibration cycle may be skipped. In some embodiments, slight differences between channel offsets may be recorded and used in determining touch location.

In some embodiments, the differential measurements may enable a reduction of up to half of the burst length, allowing a corresponding improvement in response time while retaining a similar signal to noise ratio. In some embodiments, the acquired signals may be transformed to provide signals that are identical to signals provided via conventional burst methods, such that existing position computation algorithms may be used to determine touch locations.

The invention claimed is:

1. A controller comprising:
   drive circuitry operable to:
   drive, over a time period, one target drive electrode of a touch sensitive device with a series of pulses having a predetermined phase, the series of pulses having the predetermined phase being a series of consecutive pulses having the predetermined phase; and
   drive, over the time period, each of at least first and second drive electrodes of the touch sensitive device with a corresponding series of out-of-phase pulses, the first and second drive electrodes each being directly adjacent to the target drive electrode, one or more of the first and second drive electrodes being driven using fractional bursts of out-of-phase pulses such that at least one of the first and second drive electrodes is not driven with a corresponding out-of-phase pulse for at least one pulse of the series of pulses; and
   sense circuitry operable to receive signal transferred to sense electrodes from the drive electrodes of the touch sensitive device, wherein the received signal is responsive to one or more touches on the touch sensitive device.

2. The controller of claim 1, wherein, in addition to driving each of the at least first and second electrodes of the touch sensitive device with the corresponding series of out-of-phase pulses, the drive circuitry is operable to drive, over the time period, each of all other drive electrodes in the touch sensitive device with a corresponding series of out-of-phase pulses.

3. The controller of claim 1, wherein the out-of-phase pulses are of opposite polarity to the pulses having the predetermined phase.

4. The controller of claim 1, wherein a number of out-of-phase pulses in the series of pulses is different than a number of predetermined phase pulses.

5. The controller of claim 1, and further comprising a touch sensitive device having drive electrodes coupled to the drive circuitry and sense electrodes coupled to the sense circuitry.

6. The controller of claim 5, wherein the drive and sense electrodes are formed in a single layer.

7. The controller of claim 5, wherein the drive and sense electrodes are formed in separate layers.

8. The controller of claim 1, and further comprising signal processing logic to determine a reference signal from the received signals acquired during driving multiple target drive electrodes.

9. The controller of claim 8, wherein the reference signal is a normalized average of the received signals acquired during driving multiple target drive electrodes.

10. The controller of claim 8, wherein the reference signal is a minimum of the received signals.

11. The controller of claim 8, wherein the signal processing logic determines a position signal by subtracting the reference signal from one or more of the received signals.

12. A method comprising:
   pulsing, over a time period, a target field emitting electrode of a touch sensitive device with a series of predetermined phase pulses, the series of predetermined phase pulses being a series of consecutive pulses;
   pulsing, over the time period, each of at least first and second field emitting electrodes of the touch sensitive device with a corresponding series of out-of-phase pulses, the first and second field emitting electrodes each being directly adjacent to the target field emitting electrode, the first and second field emitting electrodes being pulsed using fractional bursts of out-of-phase pulses such that the first and second field emitting electrodes are not pulsed with a corresponding out-of-phase pulse for at least one pulse of the series of pulses; and
   acquiring signal from at least one receive electrode to determine a position of one or more touches on the touch sensitive device.

13. The method of claim 12, wherein, in addition to pulsing each of the at least first and second field emitting electrodes with the corresponding series of out-of-phase pulses, the method includes pulsing, over the time period, each of all other drive electrodes in the touch sensitive device with a corresponding series of out-of-phase pulses.

14. The method of claim 12, wherein the out-of-phase pulses are of opposite polarity to the predetermined phase pulses.

15. The method of claim 12, wherein a number of out-of-phase pulses in the series of pulses is different than a number of predetermined phase pulses.

16. The method of claim 12, and further comprising determining a reference signal from acquired signals during driving multiple target drive electrodes for a touch.

17. The method of claim 16, wherein the reference signal is a normalized average of the acquired signals.

18. The method of claim 16, and further comprising determining a touch position by subtracting the reference signal from one or more of the acquired signals.

19. A system comprising:
   drive circuitry operable to sequentially drive, over a time period, target drive electrodes of a touch sensitive device with a series of predetermined phase pulses, the series of predetermined phase pulses being a series of consecutive pulses, and to drive, over the time period, each of at least first and second drive electrodes of the touch sensitive device with a corresponding series of out-of-phase pulses, the first and second drive electrodes being directly adjacent to at least one of the target drive electrodes, one or more of the first and second drive electrodes being driven using fractional bursts of out-of-phase pulses such that at least one of the first and second drive electrodes is not driven with a corresponding out-of-phase pulse for at least one pulse of the series of pulses;
   sense circuitry operable to receive signal transferred to multiple sense electrodes from the drive electrodes of the touch sensitive device, wherein the received signal is responsive to a touch on the touch sensitive device; and
   signal processing logic operable to determine a reference signal from the received signals acquired during driving multiple target drive electrodes for the touch.

* * * * *